UNITED STATES PATENT OFFICE.

WILLIAM THOMPSON, OF DUBLIN, IRELAND.

IMPROVED COMPOUND FOR FINING, PURIFYING, AND MELLOWING SPIRITUOUS LIQUORS.

Specification forming part of Letters Patent No. 52,943, dated February 27, 1866.

*To all whom it may concern:*

Be it known that I, WILLIAM THOMPSON, of No. 85 Lower Gardiner street, in the city and county of Dublin, Ireland, have invented an Improved Spirituous or Vinous Compound for Fining, Purifying, and Mellowing Spirituous Liquors; and I do hereby declare that the following is a full and exact description of the said invention—that is to say—

My invention has for its object the manufacture of an improved compound vinous or spirituous liquor, which I call "prune wine," to be employed for fining, purifying, and mellowing spirituous liquors of all descriptions. For this purpose I steep, press, and mix together, to make one thousand gallons of prune wine, twenty hundred-weight of French prunes, fifteen hundred-weight of Muscatel raisins, one hundred gallons of rectified spirits of wine, fifty gallons of extract of prunes, forty-eight pounds of acetic ether, four hundred and fifty gallons of Sicilian wine, called "Syracuse," twenty gallons of extract of vanilla, one hundred and eight gallons of a Spanish wine known as "vin de color," twenty hundred-weight of refined sugar or honey, three hundred gallons of water, distilled, if convenient. The whole of these ingredients are steeped, pressed, and incorporated in a large vat, and are allowed to ferment for eight weeks, or a longer or a shorter period, according as the attenuation is retarded or accelerated by a decrease or increase in the temperature of the atmosphere, care being taken that the temperature of the wash does not fall below 50° Fahrenheit nor rise above 90° Fahrenheit. When the required gravity is attained, which may be set down as 100.40, (equal to 40 above water,) the resulting vinous compound may be racked off into smaller casks and allowed to stand until it becomes bright, when it will be ready for use.

I do not bind myself to the proportions given, as these may be varied according to the quality of the various substances named, and in some cases some of the ingredients—such as Spanish vin de color, or the Sicilian wine, called "Syracuse"—may be omitted, or other white or brown Spanish, French, or German wines used in their stead.

The before-described compound is employed for fining and purifying spirituous liquors by acting upon the fusel-oils contained therein, while the vinous properties thereof at the same time impart to such liquors a mellowness of flavor quite equal to that attained by storing them for many years in casks. For this purpose, when the prune wine is employed for fining new whisky, it will be found expedient to mix one gallon of the former to fourteen gallons of the latter, while, when the whisky is from six months to three years and upward old, the proportion should vary from one gallon of prune wine to sixteen gallons of whisky, down to one gallon of the former to thirty gallons of the latter.

For new brandy, three gallons prune wine should be mixed with one puncheon thereof; for new rum, five gallons prune wine to one puncheon, and for new Geneva, two gallons to one puncheon. The required effect will be found to have been attained if the mixture is allowed to stand for one day.

Having now described the nature of my invention, and the manner of performing the same, what I claim is—

An improved spirituous or vinous compound for fining, purifying, and mellowing spirituous liquors, containing an admixture of prunes, saccharine matter, water, rectified spirits of wine, and extract of prunes, prepared in manner and for the purposes substantially as hereinbefore set forth.

In testimony whereof I have signed my name to this specification in the presence of two subscribing witnesses.

WILLIAM THOMPSON. [L. S.]

Witnesses:
J. K. MAUBRY,
RICHARD LOWE.